(12) United States Patent
  Garcia

(10) Patent No.: US 9,934,382 B2
(45) Date of Patent: Apr. 3, 2018

(54) VIRTUAL MACHINE IMAGE ENCRYPTION

(71) Applicant: Cloudera, Inc., Palo Alto, CA (US)

(72) Inventor: Eduardo Garcia, Austin, TX (US)

(73) Assignee: Cloudera, Inc., Palo Alto, CA (US)

( * ) Notice: Subject to any disclaimer, the term of this patent is extended or adjusted under 35 U.S.C. 154(b) by 548 days.

(21) Appl. No.: 14/526,372

(22) Filed: Oct. 28, 2014

(65) Prior Publication Data

US 2016/0350535 A1    Dec. 1, 2016

Related U.S. Application Data

(60) Provisional application No. 61/896,403, filed on Oct. 28, 2013.

(51) Int. Cl.
  *G06F 21/57*    (2013.01)
  *G06F 9/455*    (2018.01)
  *G06F 9/44*     (2018.01)

(52) U.S. Cl.
  CPC ........ *G06F 21/572* (2013.01); *G06F 9/45558* (2013.01); *G06F 21/575* (2013.01); *G06F 9/4406* (2013.01); *G06F 2009/45575* (2013.01); *G06F 2221/033* (2013.01)

(58) Field of Classification Search
  CPC ........ G06F 21/572; G06F 9/4406; G06F 8/65; G06F 21/575; G06F 2221/033; H04L 63/126
  USPC ...................................................... 713/189, 2
  See application file for complete search history.

(56) References Cited

U.S. PATENT DOCUMENTS

| | | |
|---|---|---|
| 5,325,522 A | 6/1994 | Vaughn |
| 5,825,877 A | 10/1998 | Dan et al. |
| 6,542,930 B1 | 4/2003 | Auvenshine |
| 6,553,476 B1 | 4/2003 | Ayaki et al. |
| 6,651,242 B1 | 11/2003 | Hebbagodi et al. |
| 6,678,828 B1 | 1/2004 | Pham et al. |
| 6,687,847 B1 | 2/2004 | Aguilera et al. |
| 6,928,328 B2 | 8/2005 | Deitz et al. |
| 6,931,530 B2 | 8/2005 | Pham et al. |
| 7,031,981 B1 | 4/2006 | DeLuca et al. |
| 7,069,497 B1 | 6/2006 | Desai |
| 7,076,312 B2 | 7/2006 | Law et al. |

(Continued)

OTHER PUBLICATIONS

Babaoglu, O., and K. Marzullo, "Consistent global states of distributed systems: Fundamental concepts and mechanisms," *Distributed Systems*, 53 pages, Jan. 1993.

(Continued)

*Primary Examiner* — Baotran N To
(74) *Attorney, Agent, or Firm* — Perkins Coie LLP

(57) ABSTRACT

Embodiments of the present disclosure include systems and methods for encrypting a virtual machine image and accessing an encrypted virtual machine image. According to some embodiments an encryption module can encrypt a virtual machine image and place an encryption boot loader. The encryption boot loader may be extracted from the encrypted virtual machine image, be transmitted to, and stored at a key storage system. Upon a request to boot an operating system associated with the encrypted virtual machine image, a pre-boot execution environment may communicate with an image service to retrieve the encryption boot loader from the remote key storage system. The virtual machine image may therefore be decrypted suing the encryption boot loader, which may allow booting of the operating system.

14 Claims, 10 Drawing Sheets

(56) References Cited

U.S. PATENT DOCUMENTS

| | | |
|---|---|---|
| 7,107,323 B2 | 9/2006 | Hara et al. |
| 7,143,288 B2 | 11/2006 | Pham et al. |
| 7,325,041 B2 | 1/2008 | Hara et al. |
| 7,350,237 B2 | 3/2008 | Vogel et al. |
| 7,392,421 B1 | 6/2008 | Bloomstein et al. |
| 7,464,162 B2 | 12/2008 | Chan et al. |
| 7,487,228 B1 | 2/2009 | Preslan et al. |
| 7,496,829 B2 | 2/2009 | Rubin et al. |
| 7,519,826 B2 | 4/2009 | Carley et al. |
| 7,620,698 B2 | 11/2009 | Hara et al. |
| 7,631,034 B1 | 12/2009 | Haustein et al. |
| 7,640,512 B1 | 12/2009 | Appling |
| 7,653,668 B1 | 1/2010 | Shelat et al. |
| 7,685,109 B1 | 3/2010 | Ransil et al. |
| 7,698,321 B2 | 4/2010 | Hackworth |
| 7,734,927 B2 | 6/2010 | Stewart et al. |
| 7,734,961 B2 | 6/2010 | Almoustafa et al. |
| 7,818,313 B2 | 10/2010 | Tsimelzon et al. |
| 7,831,991 B1 | 11/2010 | Kiraly |
| 7,937,482 B1 | 5/2011 | Vermeulen et al. |
| 7,941,829 B2 | 5/2011 | Carley et al. |
| 7,970,861 B2 | 6/2011 | Simitci et al. |
| 7,984,043 B1 | 7/2011 | Waas |
| 8,024,560 B1 | 9/2011 | Alten |
| 8,051,491 B1 | 11/2011 | Cavage et al. |
| 8,069,267 B2 | 11/2011 | Powers-Boyle et al. |
| 8,108,338 B2 | 1/2012 | Castro et al. |
| 8,108,771 B2 | 1/2012 | Chijiiwa et al. |
| 8,155,322 B2 | 4/2012 | Bellare et al. |
| 8,306,919 B2 | 11/2012 | Sakamura et al. |
| 8,311,980 B2 | 11/2012 | Saito et al. |
| 8,341,707 B2 | 12/2012 | Carley et al. |
| 8,429,757 B1 | 4/2013 | Cavage et al. |
| 8,468,244 B2 | 6/2013 | Redlich et al. |
| 8,484,716 B1 | 7/2013 | Hodgson et al. |
| 8,631,403 B2 | 1/2014 | Soundararajan et al. |
| 8,806,595 B2 | 1/2014 | Nimashakavi et al. |
| 8,655,939 B2 | 2/2014 | Redlich et al. |
| 8,667,267 B1 | 3/2014 | Garcia et al. |
| 8,732,674 B1 | 5/2014 | Agha |
| 8,788,815 B1 | 7/2014 | Garcia et al. |
| 8,821,602 B2 | 9/2014 | McAlister |
| 8,904,181 B1 | 12/2014 | Felsher et al. |
| 9,338,008 B1 | 5/2016 | Kirkland et al. |
| 2002/0055989 A1 | 5/2002 | Stringer-Calvert et al. |
| 2002/0073322 A1 | 6/2002 | Park et al. |
| 2002/0138762 A1 | 9/2002 | Horne |
| 2002/0174194 A1 | 11/2002 | Mooney et al. |
| 2002/0184535 A1 | 12/2002 | Moaven et al. |
| 2002/0199119 A1 | 12/2002 | Dunnion et al. |
| 2003/0051036 A1 | 3/2003 | Wang et al. |
| 2003/0055868 A1 | 3/2003 | Fletcher et al. |
| 2003/0093633 A1 | 5/2003 | Thiesfeld et al. |
| 2004/0003322 A1 | 1/2004 | Collins et al. |
| 2004/0019807 A1 | 1/2004 | Freund |
| 2004/0059728 A1 | 3/2004 | Miller et al. |
| 2004/0059924 A1 | 3/2004 | Soto et al. |
| 2004/0103166 A1 | 5/2004 | Bae et al. |
| 2004/0128506 A1 | 7/2004 | Blakley et al. |
| 2004/0172421 A1 | 9/2004 | Saito et al. |
| 2004/0186832 A1 | 9/2004 | Jardin |
| 2005/0033957 A1 | 2/2005 | Enokida |
| 2005/0044311 A1 | 2/2005 | Lahiri et al. |
| 2005/0071708 A1 | 3/2005 | Bartfai et al. |
| 2005/0091244 A1 | 4/2005 | Marcotte |
| 2005/0114650 A1 | 5/2005 | Rockwood et al. |
| 2005/0138111 A1 | 6/2005 | Aton et al. |
| 2005/0171983 A1 | 8/2005 | Deo et al. |
| 2005/0182749 A1 | 8/2005 | Matsui |
| 2006/0020854 A1 | 1/2006 | Cardona et al. |
| 2006/0036850 A1 | 2/2006 | Enokida |
| 2006/0050877 A1 | 3/2006 | Nakamura |
| 2006/0143453 A1 | 6/2006 | Imamoto et al. |
| 2006/0156018 A1 | 7/2006 | Lauer et al. |
| 2006/0224784 A1 | 10/2006 | Nishimoto et al. |
| 2006/0247897 A1 | 11/2006 | Lin |
| 2007/0079112 A1* | 4/2007 | Lewis ............... G06F 21/575 713/2 |
| 2007/0100913 A1 | 5/2007 | Sumner et al. |
| 2007/0113188 A1 | 5/2007 | Bales et al. |
| 2007/0136442 A1 | 6/2007 | Palma et al. |
| 2007/0172066 A1 | 7/2007 | Davin |
| 2007/0177737 A1 | 8/2007 | Jung et al. |
| 2007/0180255 A1 | 8/2007 | Hanada et al. |
| 2007/0186112 A1 | 8/2007 | Perlin et al. |
| 2007/0226488 A1 | 9/2007 | Lin et al. |
| 2007/0234115 A1 | 10/2007 | Saika |
| 2007/0255943 A1 | 11/2007 | Kern et al. |
| 2007/0256133 A1 | 11/2007 | Garbow et al. |
| 2007/0282988 A1 | 12/2007 | Bornhoevd et al. |
| 2008/0104579 A1 | 5/2008 | Hartmann |
| 2008/0140630 A1 | 6/2008 | Sato et al. |
| 2008/0168135 A1 | 7/2008 | Redlich et al. |
| 2008/0244307 A1 | 10/2008 | Dasari et al. |
| 2008/0256486 A1 | 10/2008 | Hagiwara |
| 2008/0263006 A1 | 10/2008 | Wolber et al. |
| 2008/0276130 A1 | 11/2008 | Almoustafa et al. |
| 2008/0307181 A1 | 12/2008 | Kuszmaul et al. |
| 2009/0013029 A1 | 1/2009 | Childress et al. |
| 2009/0150675 A1 | 6/2009 | Cook |
| 2009/0150968 A1 | 6/2009 | Ozzie et al. |
| 2009/0177697 A1 | 7/2009 | Gao et al. |
| 2009/0259838 A1 | 10/2009 | Lin |
| 2009/0307783 A1 | 12/2009 | Maeda et al. |
| 2010/0008509 A1 | 1/2010 | Matsushita et al. |
| 2010/0010968 A1 | 1/2010 | Redlich et al. |
| 2010/0070769 A1 | 3/2010 | Shima et al. |
| 2010/0131817 A1 | 5/2010 | Kong et al. |
| 2010/0179855 A1 | 7/2010 | Chen et al. |
| 2010/0198972 A1 | 8/2010 | Umbehocker |
| 2010/0242102 A1 | 9/2010 | Cross et al. |
| 2010/0296652 A1 | 11/2010 | Nakayama et al. |
| 2010/0306286 A1 | 12/2010 | Chiu et al. |
| 2010/0313246 A1 | 12/2010 | Irvine |
| 2010/0325713 A1 | 12/2010 | Kurita et al. |
| 2010/0332373 A1 | 12/2010 | Crabtree et al. |
| 2011/0023097 A1 | 1/2011 | McDiarmid et al. |
| 2011/0055578 A1 | 3/2011 | Resch |
| 2011/0078549 A1 | 3/2011 | Thueringer et al. |
| 2011/0119328 A1 | 5/2011 | Simitci et al. |
| 2011/0179160 A1 | 7/2011 | Liu et al. |
| 2011/0228668 A1 | 9/2011 | Pillai et al. |
| 2011/0236873 A1 | 9/2011 | Bowers |
| 2011/0246816 A1 | 10/2011 | Hsieh et al. |
| 2011/0246826 A1 | 10/2011 | Hsieh et al. |
| 2011/0276396 A1 | 11/2011 | Rathod |
| 2011/0276495 A1 | 11/2011 | Varadarajan et al. |
| 2011/0302400 A1* | 12/2011 | Maino ............... G06F 21/575 713/2 |
| 2011/0302417 A1 | 12/2011 | Whillock et al. |
| 2011/0307534 A1 | 12/2011 | Peng et al. |
| 2012/0036146 A1 | 2/2012 | Annapragada |
| 2012/0036357 A1 | 2/2012 | Struik |
| 2012/0102072 A1 | 4/2012 | Jia et al. |
| 2012/0130874 A1 | 5/2012 | Mane et al. |
| 2012/0131341 A1 | 5/2012 | Mane et al. |
| 2012/0290850 A1* | 11/2012 | Brandt ............... G06F 21/575 713/189 |
| 2013/0031240 A1 | 1/2013 | Byzek |
| 2013/0041872 A1 | 2/2013 | Aizman et al. |
| 2013/0054976 A1 | 2/2013 | Brown et al. |
| 2013/0218840 A1 | 8/2013 | Smith et al. |
| 2013/0304761 A1 | 11/2013 | Redlich et al. |
| 2013/0318347 A1 | 11/2013 | Moffat |
| 2014/0089658 A1* | 3/2014 | Raghuram ......... H04L 9/0825 713/155 |
| 2014/0188841 A1 | 7/2014 | Sun et al. |
| 2014/0195558 A1 | 7/2014 | Murthy et al. |

OTHER PUBLICATIONS

Beomseok Nam et al: "Spatial indexing of distributed multidimensional datasets", Cluster Computing and the Grid, 2005. CCGRID

(56) References Cited

OTHER PUBLICATIONS

2005. IEEE International Symposium on Cardiff~Wales, UK May 9-12, 2005, Piscataway, NJ, USA,IEEE, Piscataway, NJ, USA, vol. 2, May 9, 2005, pp. 743-750.
Canada Exam Report for application No. 2843459, dated Aug. 5, 2014, 3 pages.
Chapter 25: Distributed Databases ED—Ramez Elmasri; Shamkant B Navathe (eds), Jan. 1, 2011 (Jan. 1, 2011), Fundamentals of Database Systems (Sixth Edition), Addison-Wesley, pp. 877-927.
Cheng, Security Attack Safe Mobil and Cloud-Based One-Time Password Tokens Using Rubbing Encryption Algorithm, ACM, Jun. 2011, pp. 304-336.
Corbett et al., "Spanner: Google's Globally Distributed Database," *Transactions on Computer Systems* (*TOCS*), vol. 31, No. 3, 14 pages, Aug. 2013.
Du et al., "A Pairwise Key Predistribution Scheme for Wireless Sensor Networks," ACM, May 2005, vol. 8 Issue 2, pp. 228-258.
European Search Report for European Application No. 14157984.7, dated Jun. 6, 2014, 10 pages.
Exam Report for GB1403929.1, Applicant: Cloudera, Inc, dated May 2, 2014, 6 pages.
Kim et al., Design and Implementation of a Private and Public Key Crypto Processor and Its Applicaiton to a Security System, IEEE, Feb. 2004, vol. 50, Issue 1, pp. 214-224.
Ko et al., "A Study of Encryption Algorithm for RFID tag (SEED: 8 Rounds×64 bit block)," IEEE, s008, pp. 672-677.
Kossmann D: "The State of the Art in Distributed Query Processing", ACM Computing Surveys, ACM, New York, NY, us, vol. 32, No. 4, Dec. 1, 2000, pp. 422-469.
Lamport, L., "Time, clocks, and the ordering of events in a distributed system," *Communications of the ACM*, vol. 21, No. 7, pp. 558-565, Jul. 1978.
Non-Final Office Action for U.S. Appl. No. 13/362,695, dated Apr. 29, 2013, 23 pgs.
Stoller, S.D., "Detecting global predicates in distributed systems with clocks," *Distributed Computing*, vol. 13, No. 2, pp. 85-98, Feb. 2000.
Tamer Dzsu et al: "Principles of Distributed Database Systems", Principles of Distributed Database Systems, XX, XX, Jan. 1, 1991 (Jan. 1, 1991), pp. 74-93.

* cited by examiner

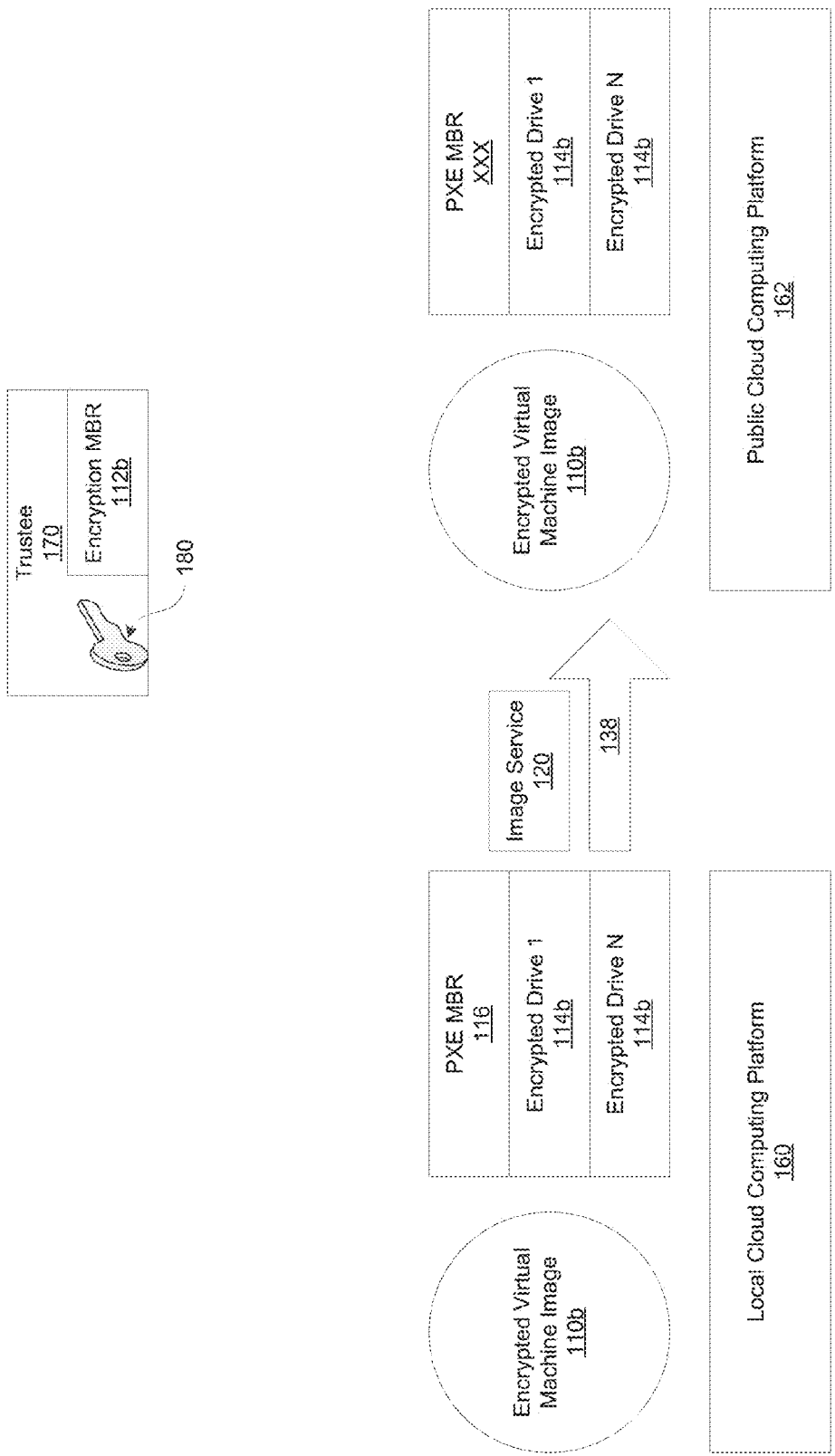

VIRTUAL MACHINE IMAGE ENCRYPTION

CROSS-REFERENCE TO RELATED APPLICATION(S)

This application is entitled to the benefit of and/or the right of priority to U.S. Provisional Application No. 61/896,403, entitled "SYSTEM AND METHOD FOR VIRTUAL MACHINE IMAGE ENCRYPTION", filed Oct. 28, 2013, which is hereby incorporated by reference in its entirety for all purposes. This application is therefore entitled to a priority date of Oct. 28, 2013.

BACKGROUND

Various cloud services provide virtual machines that provide an environment for executing applications. A virtual machine is typically defined by a virtual machine image that contains a virtual disk having a bootable operating system or other information that allows booting of an of an operating system in the virtual machine environment. In some cases, it may be desirable to secure a virtual machine image, particularly when the virtual machine image is stored or launched on a public cloud service. However, dues to security concerns it may be undesirable to maintain the authentication information at the encrypted virtual machine image. Embodiments described herein provide for encryption of virtual machine images and decryption the virtual machine image on boot.

BRIEF DESCRIPTION OF THE DRAWINGS

The present embodiments are illustrated by way of example and are not intended to be limited by the figures of the accompanying drawings. In the drawings:

FIGS. 1A-1H show a sequence of high-level conceptual diagrams illustrating the steps of an example process for encrypting a virtual machine image, according to one embodiment;

DETAILED DESCRIPTION

Figures 1A, 1B:
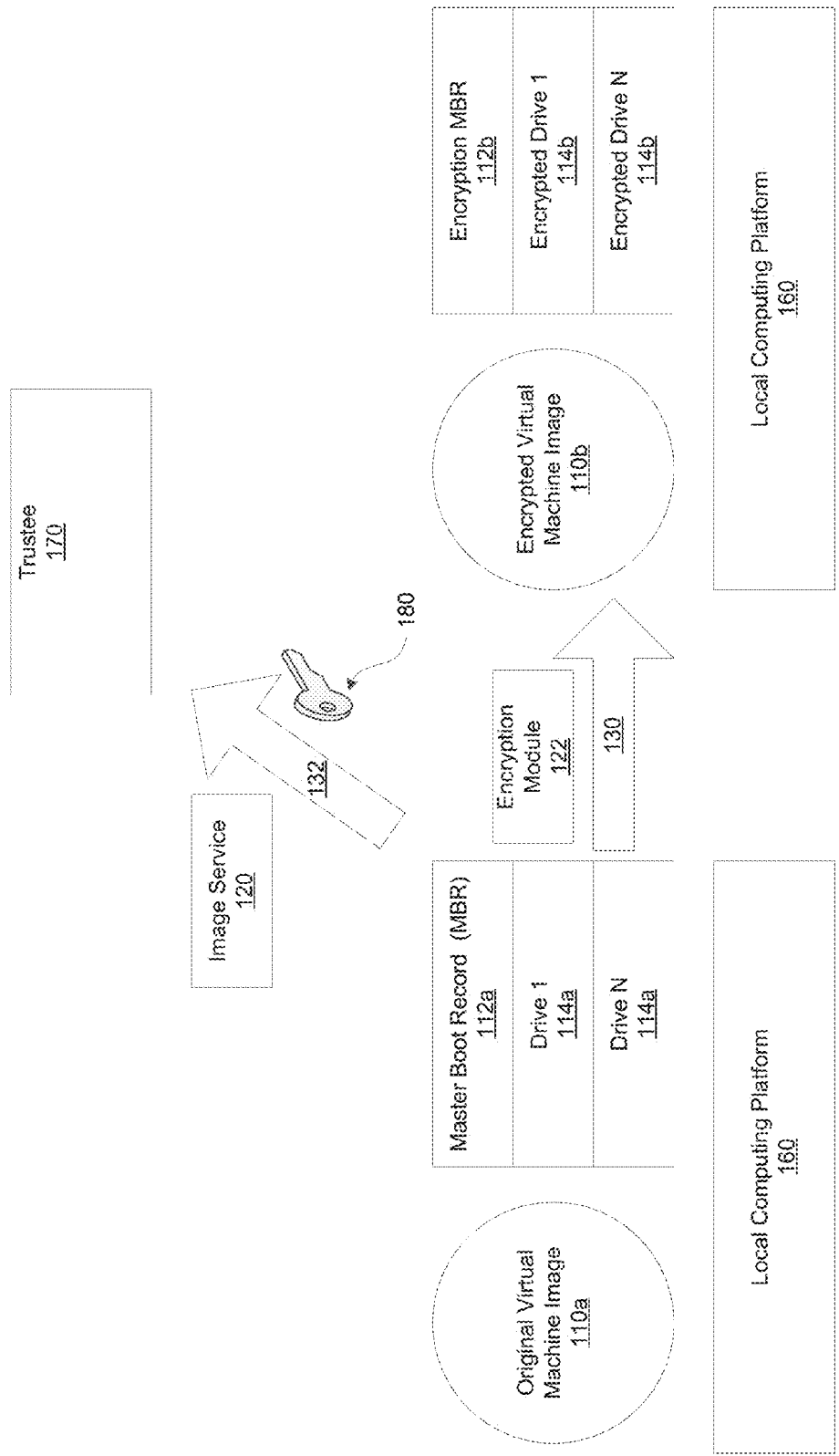

Systems and methods for encryption of images (or other information) in a cloud environment are provided. Various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the systems and methods, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or 8 is satisfied by any one of the following: A is true (or present) and 8 is false (or not present), A is false (or not present) and 8 is true (or present), and both A and 8 are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment."

Some embodiments may be implemented in a computer communicatively coupled to a network (for example, the Internet, an intranet, an internet, a WAN, a LAN, a SAN, etc.), another computer, or in a standalone computer. As is known to those skilled in the art, the computer can include a processor (e.g., central processing unit ("CPU")), at least one computer readable medium (e.g., read-only memory ("ROM"), random access memory ("RAM"), mass storage device (e.g., a hard drive ("HD"))), and one or more input/output ("1/0") interfaces (e.g., data ports, network ports, I/O device interfaces). The I/O devices can include a keyboard, monitor, printer, electronic pointing device (for example, mouse, trackball, stylist, etc.), or the like. In certain embodiments, the computer has access to at least one database locally or over the network.

Within this disclosure, the term "computer readable medium" is not limited to ROM, RAM, and HD and can include any type of non-transitory data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented by programmed logic executing suitable computer-executable instructions that may reside on a computer readable medium (for example, a disk, CD-ROM, a memory, etc.). Computer executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, or any other programming or scripting code. Other software/hardware/network architectures may be used. For example, the functions of embodiments may be implemented on one computer or shared or distributed among two or more computers across a network. In one embodiment. the functions of embodiments may be distributed in the network. Communications between computers implementing embodiments of the invention can be accomplished using any electronic, optical, radio frequency signals, or other suitable methods and tools of communication in compliance with network protocols.

It will be understood for purposes of this disclosure that a service, engine or module is one or more computer devices, configured (e.g., by a computer process or hardware) to perform one or more functions. A service, engine, or module may present one or more interfaces which can be utilized to access these functions. Such interfaces include APIs, interfaces presented for a web services, web pages, remote procedure calls, remote method invocation, etc.

Before discussing specific embodiments, a brief overview of the context of the disclosure may be helpful. Various cloud services provide virtual machines that provide an environment for executing applications. A virtual machine is typically defined by a virtual machine image that contains a virtual disk having a bootable operating system or other information that allows booting of an of an operating system in the virtual machine environment. Virtual machine images can have a variety of formats including, but not limited to, Raw, QEMU copy-on-write version 2 (qcow2), Amazon machine Image/Amazon Kernal Image/Amazon Ramdisk Image (AMI/AKI/ARI), Ubuntu Enterprise Cloud (UEC) tarball, Virtual Machine Disk (VMDK), Virtual Disk Image (VOI), Virtual Hard Disk (VHD), VHDX, Open Virtualization Format (OVF), ISO.

In some cases, it may be desirable to secure a virtual machine image, particularly when the virtual machine image is stored or launched on a public cloud service. Embodiments described herein provide for encryption of virtual machine images and decryption the virtual machine image on boot.

One embodiment comprises an image encryption system comprising an encryption module and an image service. The encryption module encrypts the system partition of a virtual machine drive on which the operating system (or information to access the operating system) is installed and may also encrypt other partitions/drives of a virtual machine. For example, the encryption service may perform a full encryption. The virtual machine image will thus be an image of a virtual machine with encrypted storage. It can be noted that the encryption module may run in the virtual machine that is encrypted using the encryption module.

To boot the virtual machine's operating system, the partition containing the operating system (or information to access the operating system) must be decrypted. To this end, the encryption module can provide a pre-boot authentication process. A boot loader can be provided that calls the encryption module as part of the boot process. The encryption module may request authentication information (credentials, keyfiles or other information) from the user or other service or be provided the information by the boot loader. If the appropriate authentication information is provided, the encryption module can decrypt the system partition and the operating system can boot. The encryption module may also decrypt other partitions.

However, it may be undesirable to maintain the encryption module boot loader with the encrypted virtual machine image. To this end, the encryption module boot loader may be stored at a key storage system while the virtual machine image contains configuration information for a modified preboot execution environment (such as a Preboot eXecution Environment (PXE), gPXE, iPXE, Etherboot, PXELINUX configuration) that initiates retrieval of the encryption module boot loader. According to one embodiment, the image service processes the image files and extracts a master boot record (MBR) inserted by the encryption module. The image service places a PXE MBR in the image and stores the encryption engine MBR in the key storage system as a deposit. Authentication keys and passwords may also be stored. According to one embodiment, the encryption module MBR and authentication information used by the encryption module for decrypting the image may be stored at the key storage system under or a license associated with the image. The image file(s) with the PXE MBR can be uploaded to a cloud service and launched.

The preboot execution environment can be configured to call the image service locally or over a network interface. The calls may include information to identify the virtual machine and other information. The image service can verify the instance of the virtual machine (e.g., using a verification engine) according to a set of rules as desired and if the virtual machine is verified, retrieve the encryption module boot loader (for example, the MBR) from the key storage system. The image service can update the virtual machine image to include the encryption module boot loader so that the encryption module can carry out the pre-boot authentication process. In some cases, the image service may also retrieve the appropriate authentication information from the key storage system and inject the authentication information in the encryption module boot loader.

FIGS. 1A-1H, show a sequence of high-level conceptual diagrams illustrating the steps of a process according to one embodiment, as described above.

In FIG. 1A an original virtual machine image 110a is shown instantiated at a local computing platform 160. Although shown instantiated at a local computing platform, it shall be understood that virtual machine image 110a may be instantiated at any computing device including a single physical computing device such as a server computer or personal computer. According to some embodiments, local computing platform 160 may include associated software for creating and executing a virtual machine such as Openstack Cloud Software, Rackspace Public Cloud and Rackspace Private Cloud, though other systems may be used. The instantiated virtual machine image 110a includes a boot loader (e.g, a master boot record or "MBR") 112a as well as associated virtual storage drives 114a.

At step 130 an encryption module 122 (e.g., TrueCrypt) encrypts the original virtual machine image 110a to create an encrypted virtual machine image 110b. As previously mentioned, the encryption module 122 can encrypt the system partition of the virtual machine image 110a on which an operating system (or other information to access the operating system) is installed. The encryption module can also encrypt all other portions/drives of the virtual machine image 110a. The resulting encrypted virtual machine image 110b may therefore include an encrypted drives 114b as well as an encryption boot loader 112b that may be required to call the encryption module 122 to perform preauthorization prior to booting the operating system from the encrypted virtual machine image 110b.

At step 132, an image service 120 transmits an authentication key or password 180 associated with the storage of secret information (e.g. the encryption boot loader 112b) to a trustee 170. According to some embodiments, the authentication key 180 is transmitted to trustee 170 via a network. Trustee 170 may be a key storage system such as Gazzang zTrustee!, though other key storage systems may be used. Trustee 170 may include components similar to those found in FIGS. 2 and 8. Additional information on the storage and access of secret information in this manner can be found herein under the section titled "Secure Release of Secret Information."

Figures 1C, 1D:
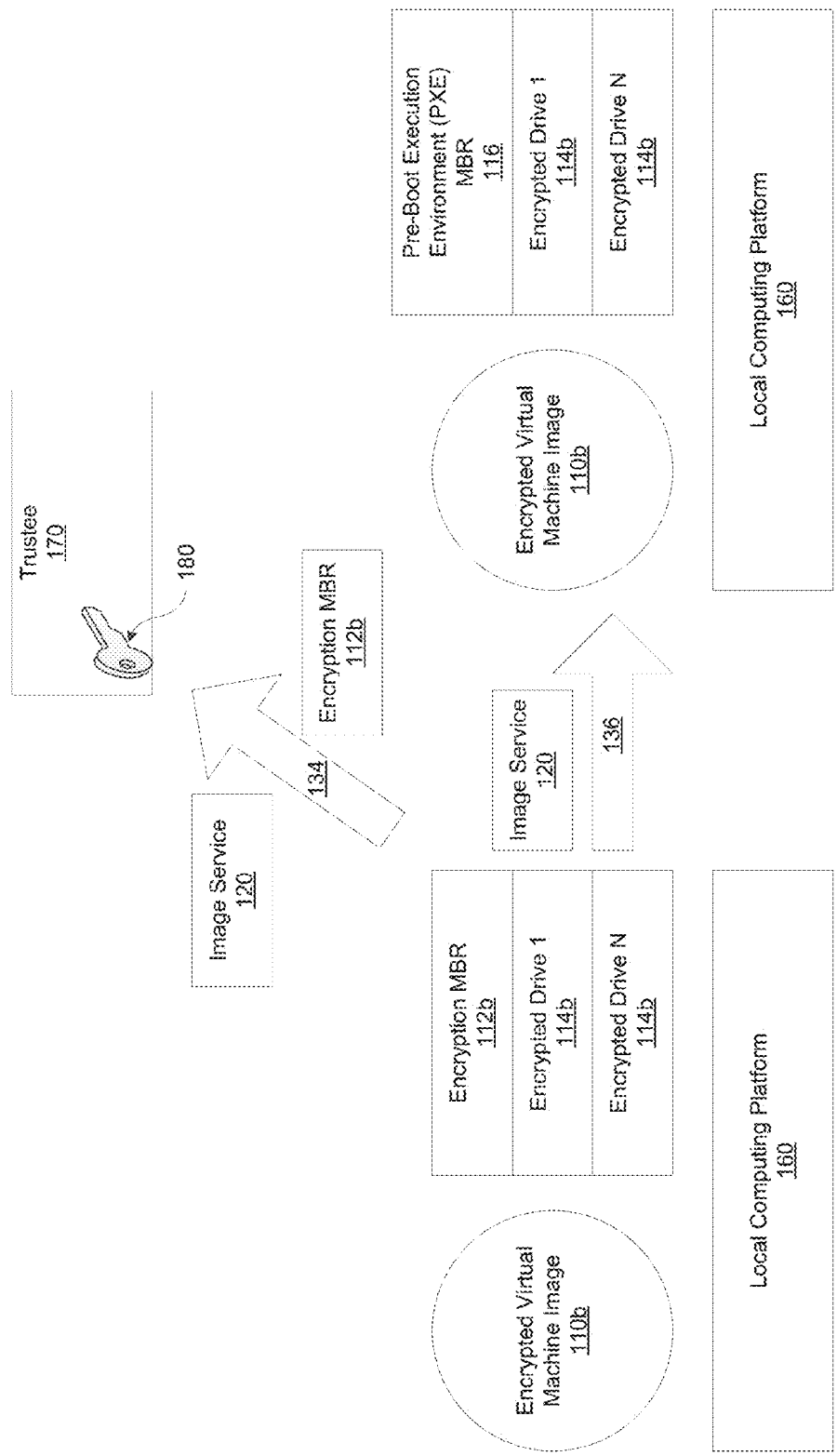

The process continues as illustrated in FIGS. 1C-1D, where at step 134 the image service 120 processes the encrypted virtual machine image 110b, extracts the encryption boot loader 112b from the encrypted virtual machine image, 110b and transmits the encryption boot loader to trustee 170. According to some embodiments the encryption boot loader 110b is transmitted via a network to the trustee 117. At step 136, the image service 120 places a pre-boot execution environment 116 on the encrypted virtual machine image 110b, taking the place of the extracted encryption boot loader 112b. The pre-boot execution environment 116 can be configured to call the image service 120 locally or over a network. The calls may include information to identify the virtual machine and other information.

The process continues as illustrated in FIGS. 1E-1F, where at step 138 the image service may transmit or upload the encrypted virtual machine image 110b to be hosted at a public cloud computing platform 162b. According to some embodiments, public cloud computing platform 162 may be hosted by a third party, for example, Amazon Web Services (AWS).

Figure 1G:
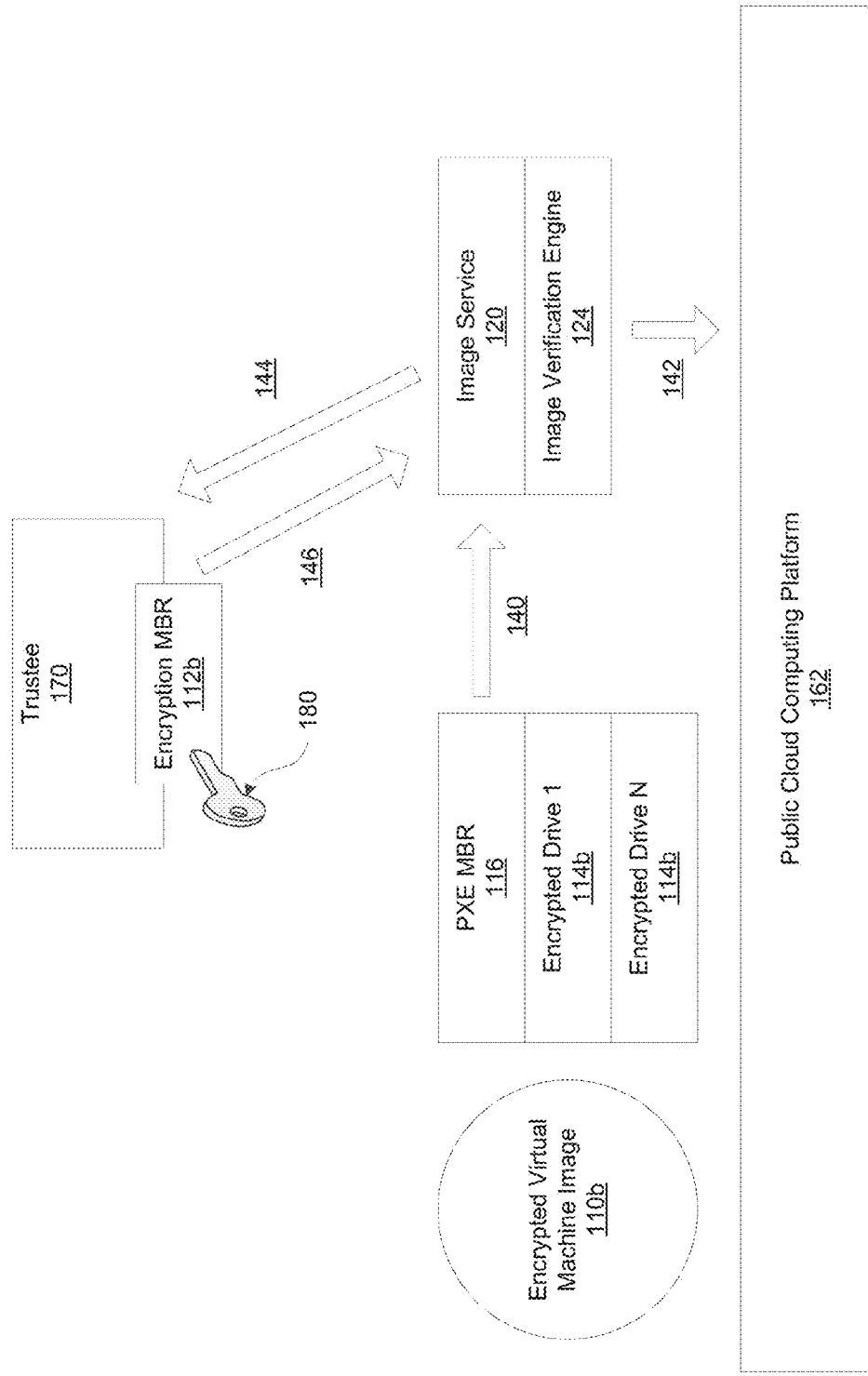

FIG. 1G shows an example process for initiating a boot of an operating system through an encrypted virtual machine image 110b. At step 140, in response to a client request to initiate the boot of an operating system associated with virtual machine image 110b, the pre-boot execution environment 116 transmits a signal or "call" to the image service 120 to initiate retrieval of the encryption boot loader 112b from the trustee 170. According to some embodiments, the signal or call may include information to identify the virtual machine associated with encrypted virtual machine image 112b and other information. According to some embodiments, at step 142, in response to the signal received from the pre-boot execution environment 116, the image service 120 may verify the identity of the requesting virtual machine instance using an image verification engine 124 that communicates with the public cloud computing platform 162 via an application programming interface (API). If the virtual machine is verified, the image service 120, at steps 144-146, retrieves the encryption boot loader 112b from the trustee 170. According to some embodiments, the image service 120 also retrieves the authentication key 180 from the trustee 170. In both cases, retrieval of information (e.g. the encryption boot loader 112b or the authentication key 180) from the trustee 170, may include processing and authentication steps as described in more detail under the section titled, "Secure Release of Secret Information." After retrieving the encryption boot loader 112b, the image service then updates the encrypted virtual machine image 110 to include the encryption boot loader 112b. According to some embodiments this process may include processing the retrieved encryption boot loader 112b by injecting the authentication key 180.

Figure 1H:
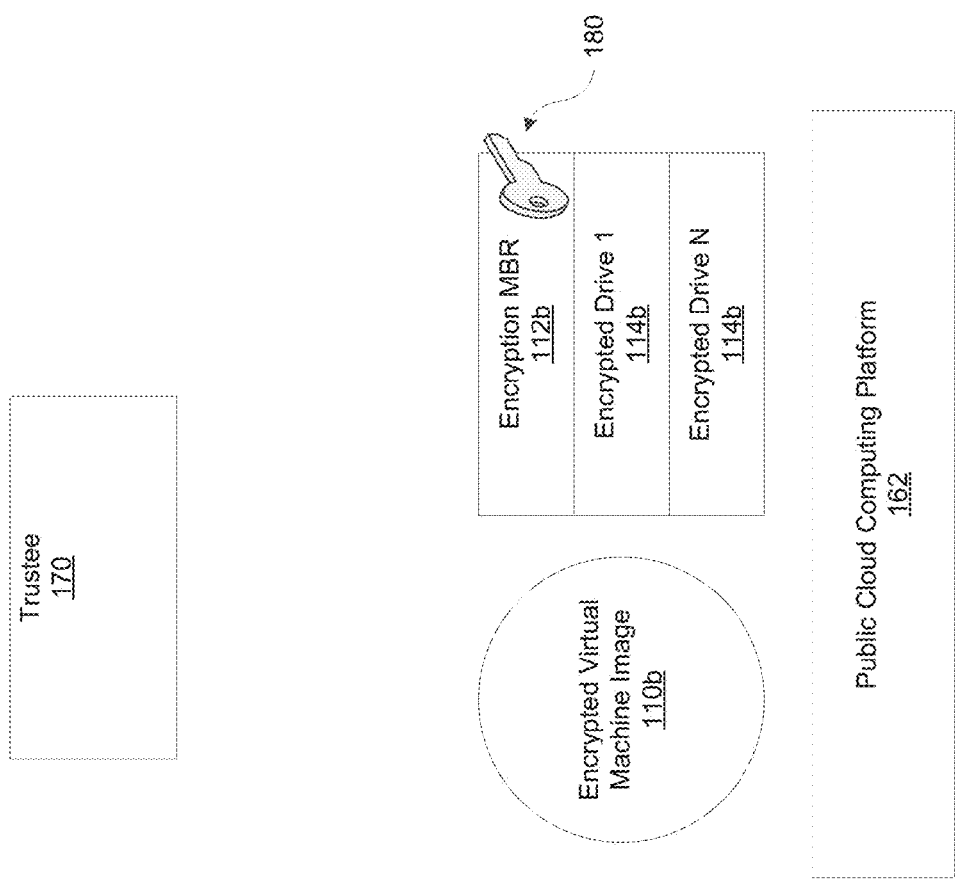

In FIG. 1H, with the authenticated encryption boot loader 112b in place, the encryption module 122 can perform a pre-boot authentication of the virtual machine, decrypt the virtual machine image 110b (or partition) associated with an operating system and boot the operating system.

Secure Release of Secret Information

The following discloses one embodiment of a system for storing deposited secret information (e.g. an encryption boot loader 110b as shown in FIGS. 1A-1H) at a key storage system (e.g. trustee 170 as shown in FIGS. 1A-1H).

Figure 2:
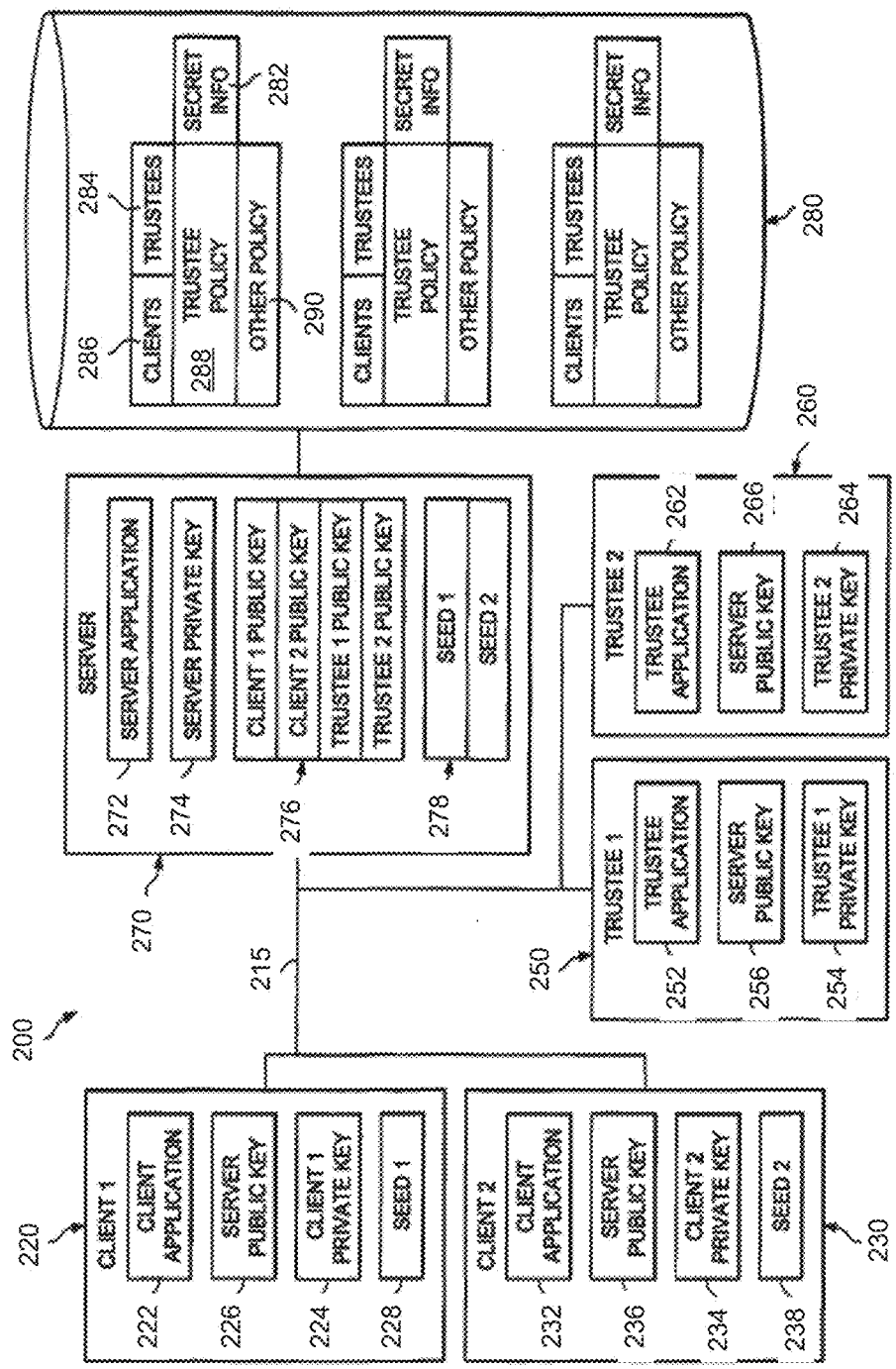
FIG. 2 shows a diagrammatic representation of an example system for providing secure and remote access to secret information, according to one embodiment.

FIG. 2 shows a diagrammatic representation of one embodiment of a system 200 providing secure and remote access to secret information. System 200 can include one or more client devices (e.g., client 220 and client 230) and one or more trustee devices (e.g., trustee devices 250 and 260) interconnected to a server 270 by a standard transmission channel 215, which may be a wired or wireless network, including a local area network (LAN), wide area network (WAN), the Internet, or other wired and/or wireless network.

Clients, according to one embodiment, can be computer systems (physical or virtual/cloud machines), which themselves run services or applications that require access to secret information (in the form of encryption keys, digital certificates, passwords or pass phrases, etc.). According to one embodiment the client device 220 and client device 230 can each provide a client application (e.g., client application 222 and client application 232). By way of example, but no limitation, the client application 222 and client application 232 may be compiled Windows/linux/MacOS programs, Android/iOS/Blackberry/WebOS mobile applications, applications running in a browser environment or other applications that register, put, and get information from server 240 over a network protocol, such/as http, https or other network protocol.

Client application 222 and client application 232 can each acquire respective public-private key pairs and store the respective private keys (e.g., client 1 private key 224 and client 2 private key 234). It can be noted that multiple client applications may reside on a single client device, with each client application having its own public-private key pair. The client public keys may be transmitted to server 240. Client application 222 and client application 232 can further store a server public key (server public key 226 and server public key 236), which may be the same server public key.

Client application 222 and client application 232 may also include rotating seeds (e.g., client 1 seed 228 and client 2 seed 238). The seeds can be used to enhance security of communications as discussed below in more detail.

Trustee device 250 and trustee device 260 can be devices associated with trusted users, machines, applications or other entities designated as a trustee. Trustee device 250 and trustee device 260 may store trustee applications (e.g., trustee application 252 and trustee application 262). By way of example, but not limitation, trustee application 252 and trustee application 262 may take several different forms, including, but not limited to simple Email and Web applications, Android/iOS/Blackberry/WebOS mobile applications, as well as native compiled clients for Windows/Mac/Linux, applications running in a browser environment or other applications.

According to one embodiment, trustee application 252 and trustee application 262 may acquire public-private key pairs and store the respective private keys (e.g., trustee 1 private key 254 and trustee 2 private key 264). Trustee application 252 and trustee application 262 may also store a copy of a server public key (e.g., server public key 256 and server public key 266), which may be the same server public key stored by other trustees and the clients.

Server 270 can provide a server application 272 configured to communicate with client applications and trustee applications. Server application 272 can maintain a server private key 274 corresponding to the server public key stored by clients and trustees, a store of public keys 276 corresponding to the client private keys and trustee private keys and a set of rotating seeds 278 corresponding to seeds distributed to clients. Seeds may also be distributed to trustees.

Server 270 may maintain a repository 280 that stores secret information and corresponding access control lists, trustee lists, trustee policies and other policies. For example, repository may 280 may include secret information 282 associated with a trustee list 284 a list of authorized clients 286, a configurable trustee policy 288 and any other policies 90 established for the secret information 282. Secret information 282 may include encrypted or non-encrypted encryption keys, digital certificates, passwords, passphrases, files, etc. Accordingly, server 270 may act as a key storage system (KS S) server or the like configured to distribute keys or other sensitive authorization information to requesting applications. Secret information 282 may be encrypted using a client encryption key for which the server 270 does not have the corresponding decryption key. In other cases, server 270 may be provided the encryption keys to fully decrypt secret information for recovery or other purposes.

One advantage to denying server 270 the ability to fully decrypt secret information 282 is that even a user with root level access to server 270 will not be able to access secret information 282. This negates the ability of a hacker or server administrator to gain access to secret information 282 even if they have access to server 270's keys. Consequently, in one embodiment, server 270 can provide a multi-tenant cloud service or other third-party service for storing secret information with a high degree of security. Other embodiments may be implemented as dedicated third-party servers or private servers.

Server application 272 may release secret information to clients upon request and appropriate validation. When a client application (e.g., client application 222 or client application 232) makes a, request to take an action on secret information 282, such as retrieving secret information 282, server application 272 can consult the list of authorized clients 286, if one is provided, to determine if the requesting client application is authorized to take the action. If the requesting client application is authorized, server application 272 can send a request to trustees in the list of trustees 284, if one is provided, to authorize release of the secret information. Based on the responses by the trustees and trustee policy 288, server application 272 may permit or deny the action by the requesting client application.

A trustee can comprise any user, machine or application that is designated as having the ability to authorize or participate in authorizing actions on a deposit in repository 280. According to one embodiment, the trustee may be provided with a dedicated trustee application (e.g., trustee application 252 or trustee application 262) for receiving and responding to authorization requests. In other implementations, the trustee may be sent an email or other message requesting authorization. If a trustee application is not provided, the trustee may respond by email, accessing a web site or taking other action through which the trustee is permitted to provide authorization. For example, the trustee may be sent an email stating that an access request has been made. The trustee may then log into a web site to provide authorization. Thus, an authorization request may be sent to the trustee by a first channel and the authorization response received over another channel.

To provide an example, repository 280 can be configured as follows: secret information 282 is an encryption key used at client 220; list of authorized clients 286 lists client application 222 as an authorized client; list of trustees 284 may list trustees corresponding to trustee device 250 and trustee device 260 as designated trustees of secret information 282; and trustee policy 284 requires approval of both trustees to release secrete information 282. In this example, if client application 222 requests secret information 282, server application 272 will consult list of authorized clients 286 and determine that the request can proceed. It can be noted that if client application 232 requests secret information 282 in this example, the request will be denied based on list of authorized clients 286.

Returning to the example in which client application 222 requests secret information 282, server application 272 can send authorization requests to trustees associated with trustee application 252 and trustee application 262. If neither or only one of the trustees approves release of secret information 282, server application 272 will not release the information based on trustee policy 288. If both trustees approve release, server application 272 can provide secret information 282 to client application 222. Client application 222, according to one embodiment, can be configured to maintain the secret information 282 only in volatile memory and discard secret information 282 after use.

It can be noted that in this example, the trustees can have the right and responsibility to release the secret information, but may not have the ability to access the secret information. Furthermore, server 270 may have the responsibility to store and distribute secret information, but not the ability to access the information. Thus, responsibility for using secret information 282 may be provided to a client that does not maintain the secret information, responsibility for persistently storing secret information 282 can be provided by a system that may not have full access to secret information 282 and responsibility for authorizing release of secret information 282 may be provided to a trustee who may not have rights to access secret information 282. Therefore, compromising secret information 282 would require compromising multiple distributed systems having different encryption keys and impersonating potentially several trustees. This can prevent a user (for example, an ex-employee) from being able to gain access to secret information 282, even if the user can gain access to a client application or the server or is still designated as a trustee.

To further enhance security, communications between sever application 272, client application 222, client application 232, trustee application 242 and trustee application 252 may occur over SSL or otherwise and may include multiple layers of encryption. According to one embodiment, the client application 222 can sign requests with the client's private key 224 and encrypt the requests with the server's public key 226. According to one embodiment, the signature can include a unique identifier for the client, such as a hash of the client's public key (a "client fingerprint"). Trustees can use similar mechanisms using the trustee's public/private keys and server public key. Server application 272 can sign communications with the server's private key 274 and encrypt responses to client application 222 with the client's public key and requests to trustee application 260 with the trustee application's public key. Server application 272 can decrypt requests and authorization responses using the server's private key 274 and verify the identity of the sending client or trustee application with the respective client or trustee public key (e.g., by extracting the client fingerprint or trustee fingerprint). Client application 222 can decrypt responses from server application 272 using the clients private key 224 and verify the identity of the server using the server's public key 226. Trustee application 252 can decrypt requests from server application 272 using the trustee private key 254 and verify the identity of the server using the server public key 256.

According to one embodiment, communications between server application 272 and client application 222 may include additional security measures. According to one embodiment, when client application 222 registers with server application 272, server application may generate a seed for client application 222, which can be an arbitrarily long random number or other seed, and provide the seed to client application 222 (seed 228). When client application 222 makes a request to server application 272, client application 222 can encrypt the seed 228 in the message using the server public key 226 or other mechanism. When server application 272 receives the message, server application 272 can decrypt the received seed 228 and compare it against an expected seed for that client application 222. If the received seed matches the expected seed for client application 222, server application 272 can allow the request to proceed (e.g., confirm the client is an authorized client, send. authorization requests to trustees, etc.). Server application 272 can generate a new random number and encrypt it with client application's 222 public key in the next response to client application 222. This seed becomes client 1 seed 228 and the expected seed for client application 222. This process can be repeated for each request and response between server application 272 and client application 222. If the received seed received from client application 222 does not match the expected seed server application 272 expects to receive from client application 222, server application 272 can generate an error and not allow the request.

The use of a rotating randomly generated seeds distributed by server application 272 minimizes the likelihood that an unauthorized user who discovered a seed in one communication (e.g., by packet sniffing and breaking decryption) will be able to authenticate with server application 272 as the proper seeds will have changed by the time the unauthorized user discovers the seeds. Seeds may also be used when communicating with trustee applications.

If a client application (e.g., client application 222) can run in multiple instances or threads, the threads may each try to access the client seed (e.g., seed 228). Mechanisms can be provided to prevent conflicts over the of seed 228, such as locking seed 228 for use by one instance or thread for a period of time, providing an array of seeds to client application 22, any one of which can be accepted by server 270 or other mechanism, configuring server 272 to accept a current seed (iteration n), an n−1 seed or n−y seed, where y can allow acceptance of an arbitrary number of past acceptable seeds.

Figure 3:
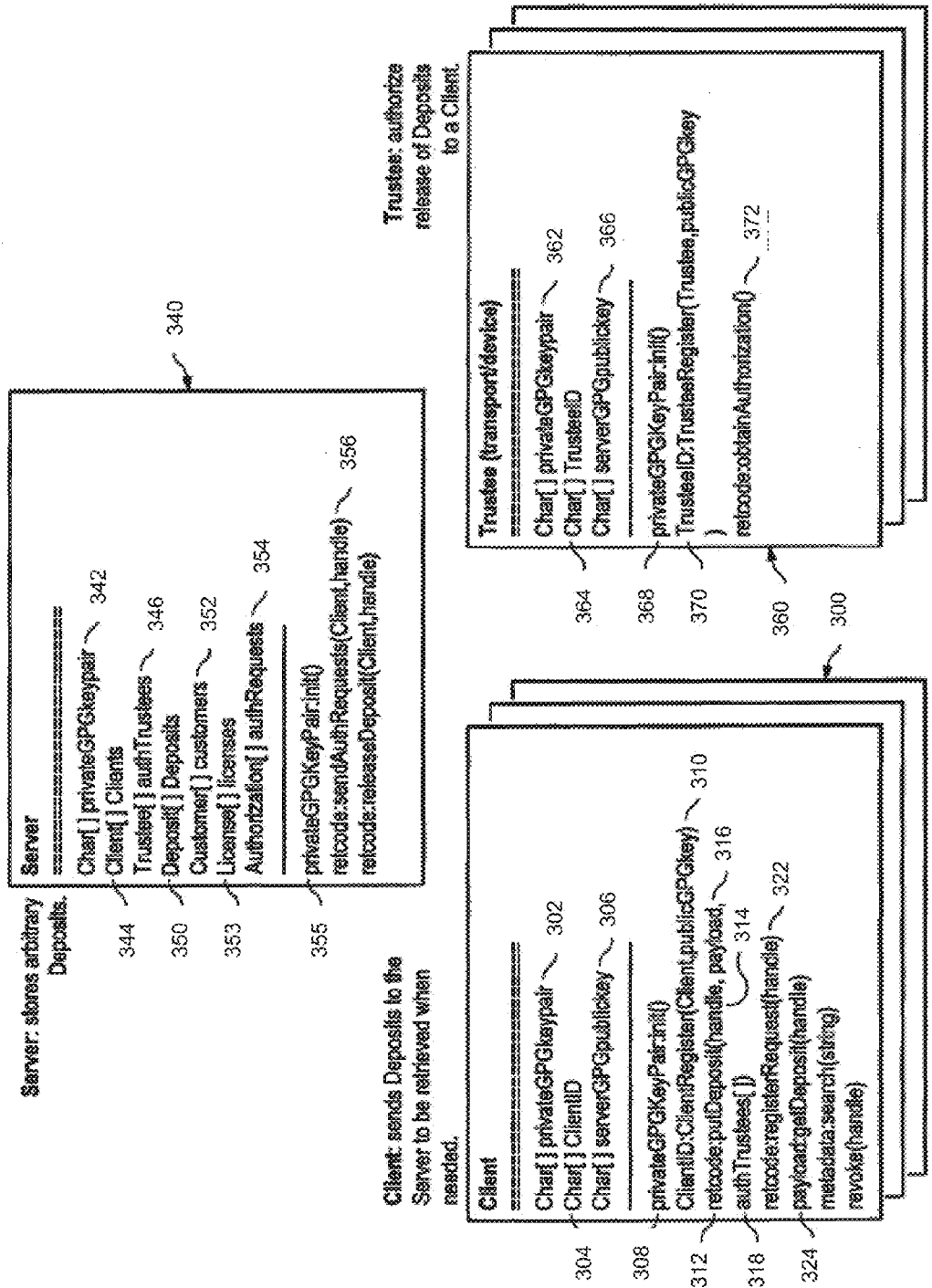
FIG. 3 shows a diagrammatic representation of example client applications, a server applications, trustee applications, according to one embodiment.

FIG. 3 shows a diagrammatic representation of one embodiment of a plurality of client applications (e.g., client applications 300), a server application 340 and a plurality of trustee applications (e.g., trustee application 360). Each client application or trustee may run on a separate client device or multiple client applications and/or trustee applications may run on the same device. The server application 340 stores arbitrary deposits of secret information that it can release to client applications 300 based on authorization from trustee application 360.

According to some embodiments, public-key cryptography such as GNU Privacy Guard (GPG), Pretty Good Privacy (PGP) or other public-key cryptography is used to verify communications between client application 300 and server application 340. In other embodiments other methods of symmetric or asymmetric cryptography can be used. For purposes of explanation GPG will be used.

Client application 300 maintains a client private encryption key 302, a client ID 304, and receives a server public encryption key 306. Server application 340 maintains a server private encryption key 342, lists of clients and their public keys 344, authorized trustees 346, deposits 350, customers 352, licenses 353, and authorization requests 354. The trustee application 360 maintains a private trustee encryption key 362, a trustee ID 364, and a server public key 366, which may be the same as server public key 306 maintained by client application 300.

In operation, the client application 300 may be configured to make, edit, disable/enable deposits, as well as purge deposits. The server application 340 stores deposits, requests authorization to release deposits from trustees and returns deposits to client application 300. The trustee application(s) 360 authorize the release of deposits to particular client applications/users.

According to one embodiment, each application may be initialized with a public-private key pair. Client application 300 can perform an initialization process 308 to acquire a client public-private key pair, server 340 can perform an initialization process 355 to acquire a server public-private key pair and trustee application 360 can perform an initialization process 368 to acquire a trustee public-private key pair. Each initialization processes may be used to generate the respective public-private key pair, receive the key pairs for a key system or otherwise acquire public-private key pairs. In some embodiments, these are GPG key pairs.

To register, the client application 300 performs a registration process 310 to send a registration request to the server application 340. The registration request can identify the client and include the client public key. Server application 340 stores the client's public key and assigns the client a unique client ID. According to one embodiment, each client application is identified by its public key and more particularly by a shorter hash of its public key (referred to as a "client fingerprint"). Next, the server application 340 sends the client application 300 the client ID and the server public key, which can be stored by client application 300 as Client ID 304 and server public key 306.

Similarly, trustee application 360 can perform a registration process 370 to send a registration request to the server application 340 including the trustee public key. The server application 340 can respond by storing the trustee application public key and assigning a unique Trustee ID. Server application 340 can send the trustee application 360 the Trustee ID and the server public key, which can be stored as Trustee ID 364 and server public key 366, respectively.

According to one embodiment, each trustee application is identified by its public key and more particularly by a shorter hash its public key (referred to as a "trustee fingerprint"). Trustee applications for enhanced security may also optionally register the physical hardware as an authorized end point to release the secret, which may be a phone's IMEI or a servers/laptop MAC address among other hardware identification methods.

According to one embodiment, client application 300 can send deposits to server application 340 for storing (represented at putDeposit process 312). The deposit can include a deposit payload containing the secret information or other content of interest, and a set of metadata for the deposit. According to one embodiment, client application 300 can generate a putDeposit request. In some embodiments, the parameters of the putDeposit request include a handle 314, the deposit payload 316, and a list of authorized trustees 318. Handle 314 can provide a name for the deposit that makes the deposit easier to identify. Trustees may be designated in any suitable manner, such as by email address, phone number or otherwise. The trustee information provided by the client application can be correlated to a trustee ID based on information provided by the trustee. In some cases the client may also set a trustee policy. The client may also specify authorized clients that can access the deposit. In one example, the client putting the deposit may not be on the list of clients allowed to later retrieve the deposit. The deposit may also include other descriptive metadata for the deposit.

As noted above, deposit payload 316 can include the secret information or other information of interest. The client can encrypt deposit payload 316 or a portion thereof with a second client private key encryption or otherwise encrypt payload 316 prior to sending the deposit to the server. According to one embodiment, server application 340 is not provided with the public key corresponding to the second private encryption key or other information needed to fully decrypt payload 316. Consequently, server application 340 may not be able to access the contents of payload 316 or the portion of payload 316 containing the secret information (or other content of interest). Thus, while server application 340 may maintain the secret information, the secret information remains secret from server application 340. In other embodiments, the secret information (or other content of interest) may be encrypted in a manner that is recoverable by server application 340. All or a portion of the deposit may be signed using client application 300's private key 302. The deposit and signature can then be encrypted using server public key 306.

The client application 300 sends the putDeposit request to the server application 340. In response, the information associated with the putDeposit request is decrypted using the server application 340's private key 342 corresponding to server public key 306, and the signature is verified using the client public key for client application 300. The deposit payload 316, authorized trustees 318, authorized client information, descriptive metadata, handle 314 and other information are then stored by server application 340. Payload 316 may include multiple layers of encryption such that payload 316 cannot be fully decrypted by server application 340 using the client's public key. Server application 340 can return a unique deposit ID to application 300.

After a deposit is put on the server by client application 300 or other client application, client application 300 can edit the deposit, disable the deposit, enable the deposit or get the deposit. Disabling the deposit marks the deposit so that it cannot be retrieved. Enabling the deposit changes a disabled deposit to an enabled state in which can be retrieved. Purging a deposit removes the deposit from the server. Actions taken by the client on the deposit may have to be authorized by trustees. In some embodiments different trustees and policies may be applied for different actions and/or deposits. In other embodiments, trustee authorization is only required for specific actions, such as retrieving a deposit.

It can be noted that server application 340 can provide search functionality so that client application 300 can search its deposits (or deposits with which it is associated) by metadata such as handles, descriptive information or deposit ID using, for example the metadata: search(string) function.

In order to retrieve a deposit, client application 300 can send a request to server application 340. According to one embodiment, a registerRequest request 322 is created. The registerRequest request 322 includes the deposit handle or other identifier as a parameter. Client application 300 sends the registerRequest request 322 to server application 340. In response to the registerRequest request 322, client application 340 can receive a request ID. Client application 300 can continue to poll the server by sending additional requests, such as a getDeposit request 324 referencing the deposit or request ID. Polling can continue until the deposit is released, the request denied or other condition occurs (timeout, etc.). If the deposit is released, client application 300 can receive the deposit payload.

Server application 340 can receive request 322. If a handle is used in request 322 and there are multiple deposits with the same handle, the server may determine the deposit to which the registerRequest action applies based on rules or default behavior. For example, the server may always assume that a request referencing a handle is referring the most recently stored deposit with that handle. If the requested deposit is associated with a list of permitted clients, server application 340 can determine if the requesting client application 300 is permitted to request the deposit. If the requesting client application 300 is not permitted to request the deposit, server application 340 can take specified actions, such as sending alerts, and end the process. If client application 300 is on the authorized client list for the requested deposit, server application 340 can generate a unique request ID and send the request ID to the client. Server application 340 can further determine the trustees for the deposit and send authorization requests 356 to the trustees.

Authorization requests 356 may be sent to trustees associated with the deposit, via email or according to any other suitable communications channel. Server application 340 can receive authorization responses from trustees and determine if release of the deposit is permitted. Trustee application 360 may obtain authorization to release the request (shown at 372). If a trustee application 360 is not provided, the trustee may respond by email, accessing a web site or taking other action through which the trustee is permitted to provide authorization. For example, the trustee may be sent an email stating that an access request has been made, specifying the client and the deposit. The trustee may then log into a web site to provide authorization. Thus, a trustee may respond on a different communications channel than the channel on which the authorization request 356 was sent to that trustee.

Server application 340 may determine whether to release the requested deposit based on the response(s) by the trustee(s) according to the trustee policy established for the deposit or default policies. In one embodiment, trustees may "vote" to authorize or not authorize the release. According to one embodiment, a trustee may vote "Yes, "No," or "Never." "Never" can be considered a "No" for the request and future requests involving the same client/deposit. Example policies for determining whether to release a deposit include, but are not limited to:

first trustee that says no closes the vote for all
any 1 of the trustees must authorize
any 2 of the trustees must authorize any N of the trustees must authorize
a majority of the trustees must authorize
all of the trustees must authorize (unanimous)

In addition, in some embodiments, in one embodiment, any given trustee may be allowed to say "Never" release the information. effectively vetoing any release.

If release is permitted, server application 340 can send the deposit payload to the requesting client application 300. If release is not permitted, server application 340 can take specified actions (e.g., generating alerts, notifying the client, etc.) and end the process.

According to one embodiment, secret data need not be stored in non-volatile memory on the systems that need to use the secret data (e.g., the client). The secret data can be securely retrieved from remote servers, used, and then discarded. Trustees can be queried and prompted on demand of the secret data to authorize or deny the requests, which can immediately release or restrict access the secret data. The release of the managed secret data can be temporarily or permanently locked when a system or a network detects a potential threat or compromise. The trustee who has the authority to release the secret data to the requesting client application does not necessarily need or have access to the raw secret data itself, which can be extremely advantageous in the event of a separation of employment or responsibility of the trustee. Furthermore, the server on which the secret data is stored may not have access to the secret data, allowing secret information to be held on third party servers or cloud servers.

Various communications between sever application 340, client application 300 and trustee application 360 may occur over SSL or otherwise and may include multiple layers of encryption. According to one embodiment, the client application 340 can sign putDeposit, registerRequest and getDeposit requests with the client's private key 302 and encrypt the requests with the server's public key 306. According to one embodiment, the signature can include the client ID (e.g., fingerprint). Server application 340 can sign communications with the server's private key 342 and encrypt responses to application 300 with the client's public key and requests to trustee application 360 with the trustee application's public key. Server application 340 can decrypt requests and authorization responses using the server's private key 342 and verify the identity of the sending client or trustee application with the respective client or trustee public key (e.g., by extracting the fingerprint). Client application 200 can decrypt responses from server application 340 using the client's private key 302 and verify the identity of the server using the servers public key 206. Trustee application 360 can decrypt requests from server application 340 using the trustee private key 362 and verify the identity of the server using the server public key 366.

According to one embodiment, communications between server application 340 and client application 300 may include additional security measures. According to one embodiment, when client application 300 registers with server application 340, server application may generate a seed for client application 300, which can be a random number and provide the seed to client application 300. When client application makes a request to server application 340, client application 300 can encrypt the seed in the message using the server public key 306. When server application 340 receives the message, server application 340 can decrypt the received seed and compare it against an expected seed for that client application 300.

If the received seed matches the expected seed for that client application, server application 340 can allow the request to proceed (e.g., confirm the client is an authorized client, send authorization requests to trustees, etc.). Server application 340 can generate a new random number and encrypt it with client public key in the next response to client application 300. This seed becomes the expected seed for client application 300. This process can be repeated for each request and response between server application 340 and client application 300. If the received seed received from client application 300 does not match the expected seed for client application 200, server application 340 can generate an error and not allow the request.

The use of a rotating randomly generated seeds distributed by server application 340 minimizes the likelihood that an unauthorized user who discovered a seed in one communication (e.g., by packet sniffing and breaking decryption) will be able to authenticate with server application 340 as the proper seeds will have changed by the time the unauthorized user discovers the seeds. One embodiment of communicating between applications using seeds is described in U.S. patent application Ser. No. 11/964,504, entitled "System and Method for Controlling Access to Decrypted Data," filed Jan. 31, 2012, by Garcia, which is hereby fully incorporated by reference herein.

Figure 4:
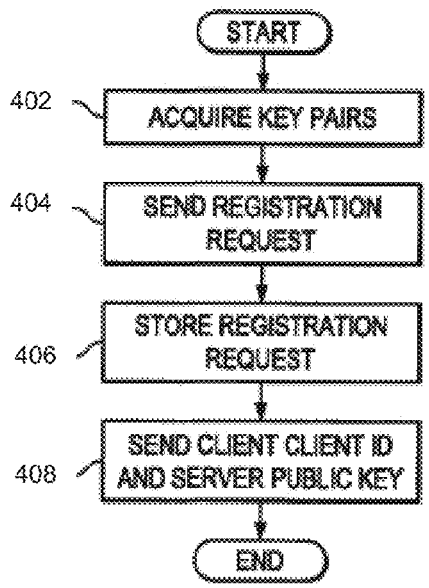
FIG. 4 shows a flowchart illustrating an example process of initialization and registration, according to one embodiment.

Turning now to FIG. 4, a flowchart illustrating initialization and registration is shown. To initialize (step 402), a client application and server application each generate a public-private key pairs, receive the key pairs from a key system or otherwise acquire public-private key pairs. In addition, in some embodiments, a trustee application generates or otherwise acquires its own public-private key pair.

To register, the client application sends a registration request to the server application (step 404). The registration request can identify the client and include the client public key. The server responds by storing the client public key and assigning a unique client ID (step 406). Next, the server application can send the client application the client ID and the server public key (step 408).

Similarly, the trustee can send a request to the server application including the trustee public key. The server application can respond by storing the trustee public key and assigning a unique trustee ID. The server application can send the trustee application the trustee ID and the server public key. The steps of FIG. 4 can be repeated as needed or desired.

Figure 5:
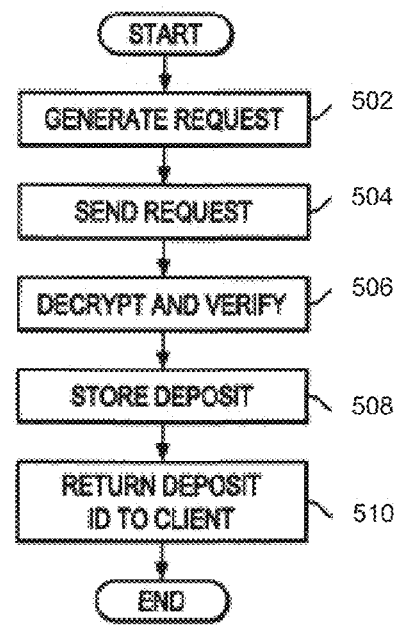
FIG. 5 shows a flow chart illustrating an example process for placing a deposit of secret information on a server, according to one embodiment.

FIG. 5 is a flow chart illustrating one embodiment of a method for placing a deposit on a server. The deposit can include a deposit payload containing secret information or other content of interest, and a set of metadata for the deposit. A client can generate a request to the server to store the deposit (step 502). In some embodiments, the parameters of the request include a handle, the deposit payload, and a list of authorized trustees. The handle can provide a name for the deposit that makes the deposit easier to identify. Trustees may be designated in any suitable manner, such as by email address, phone number or otherwise. In some cases the client may also set a trustee policy. The client may also specify authorized clients that can access the deposit. In one example, a client may put a deposit on the server that that client is not able to retrieve. The deposit may also include other descriptive metadata for the deposit.

The deposit payload can include the secret information or other information of interest. The client can encrypt the deposit payload or a portion thereof with a private encryption key for which the server may or may not have the corresponding public encryption key. Consequently, the server may or may not be able to access the contents of the contents of the payload or the portion of the payload containing the secret information (or other content of interest). Thus, while the server application may maintain the secret information, the secret information remains secret from the server application. In other embodiments, the secret information (or other content of interest) may be encrypted in a manner that is recoverable by the server application. All or a portion of the deposit may be signed using client application's client private key for which the server has the corresponding client public key. The deposit and signature can then be encrypted using server application's public key.

The client application request to store the deposit to the server application (step 504). In response (step 506), the information associated with the request is decrypted using the server's private key, and the signature is verified using the client application public key. The deposit payload, trustee authorization information, authorized client information, descriptive metadata, handle and other information are then stored by the server (step 508). Again, the payload may include multiple layers of encryption such that the payload cannot be fully decrypted by the server application using the client's public key. The server application can return a unique deposit ID to the client (step 510). The steps of FIG. 5 can be repeated as needed or desired.

Figure 6:
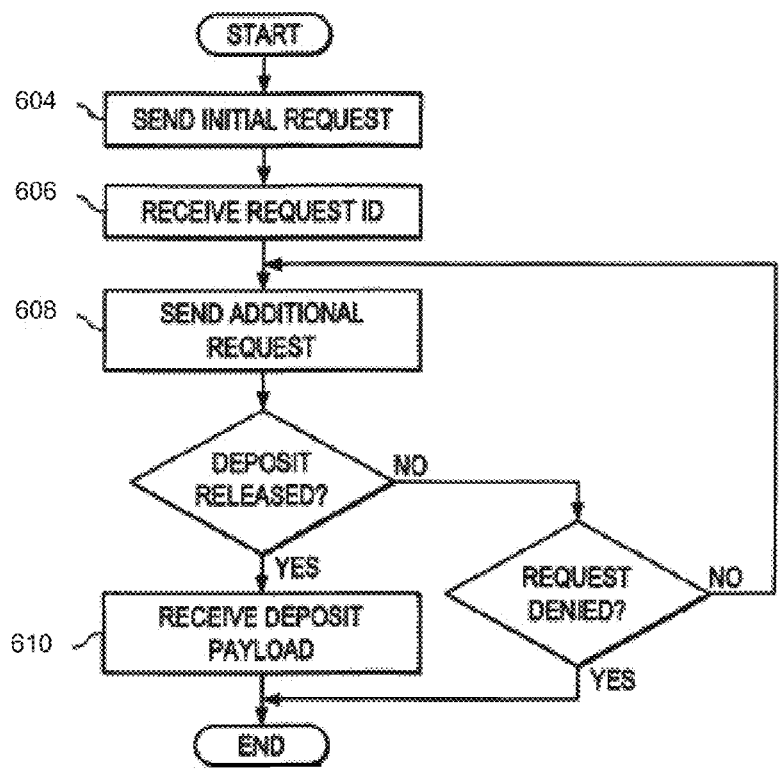
FIG. 6 shows a flow chart illustrating an example process for a client to request a deposit of secret information, according to one embodiment.

FIG. 6 is a flow chart of one embodiment of a method for a client to request a deposit. In order to retrieve deposits, a client can send a request for a deposit. According to one embodiment, the client can send an initial request (step 604) to the server identifying the deposit the client wishes to retrieve. In response to the client application can receive a request identifier (step 506). The client can send or more additional requests for the deposit (step 608). According to one embodiment, the client can poll the server by sending additional requests, such as requests referencing the deposit (e.g., by deposit identifier). Polling can continue until the deposit is released, the request denied or other condition occurs (timeout, etc.). If the deposit is released, the client application can receive the deposit payload (step 610). The steps of FIG. 6 can be repeated as needed or desired.

Figure 7:
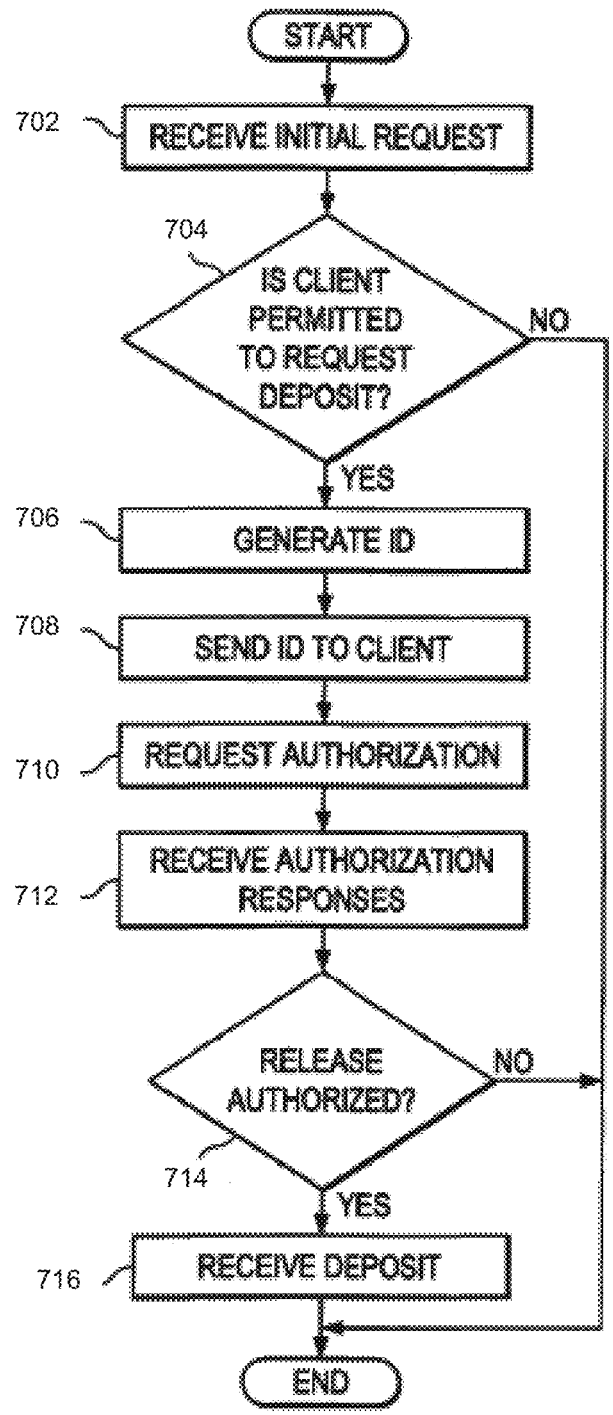
FIG. 7 shows a flow chart illustrating an example process for responding to a request for a deposit, according to one embodiment.

FIG. 7 is a flow chart illustrating one embodiment of responding to a request for a deposit. The server can receive the client's initial request (step 702). If a handle is used and there are multiple deposits with the same handle, the server may determine the deposit to which the action applies based on rules or default behavior. For example, the server may always assume that a request referencing a handle is referring the most recently stored deposit with that handle. If the requested deposit is associated with a list of permitted clients, the server can determine if the requesting client is permitted to request the deposit (step 704). If the requesting client is not permitted to request the deposit, the server can take specified actions, such as sending alerts, and end the process. If the client is on the authorized client list for the deposit, the server can generate a unique request ID (step 706) and send the request ID to the client (step 708). The server can further determine the trustees for the deposit and send authorization requests to the trustees (step 710).

Authorization requests can be sent to trustees via email or according to any other suitable communications channel. The server can receive authorization responses from trustees (step 712) and determine if release of the deposit is permitted (step 714) based on the policies associated with the deposit. If a trustee application is not provided, the trustee may respond by email, accessing a web site or taking other action through which the trustee is permitted to provide authorization. For example, the trustee may be sent an email stating that an access request has been made. The trustee may then log into a web site to provide authorization. If release is permitted, the server application can send the deposit payload to the requesting client application (step 716). If release is not permitted, the server application can take specified actions (e.g., generating alerts, notifying the client, etc.) and end the process.

Figure 8:
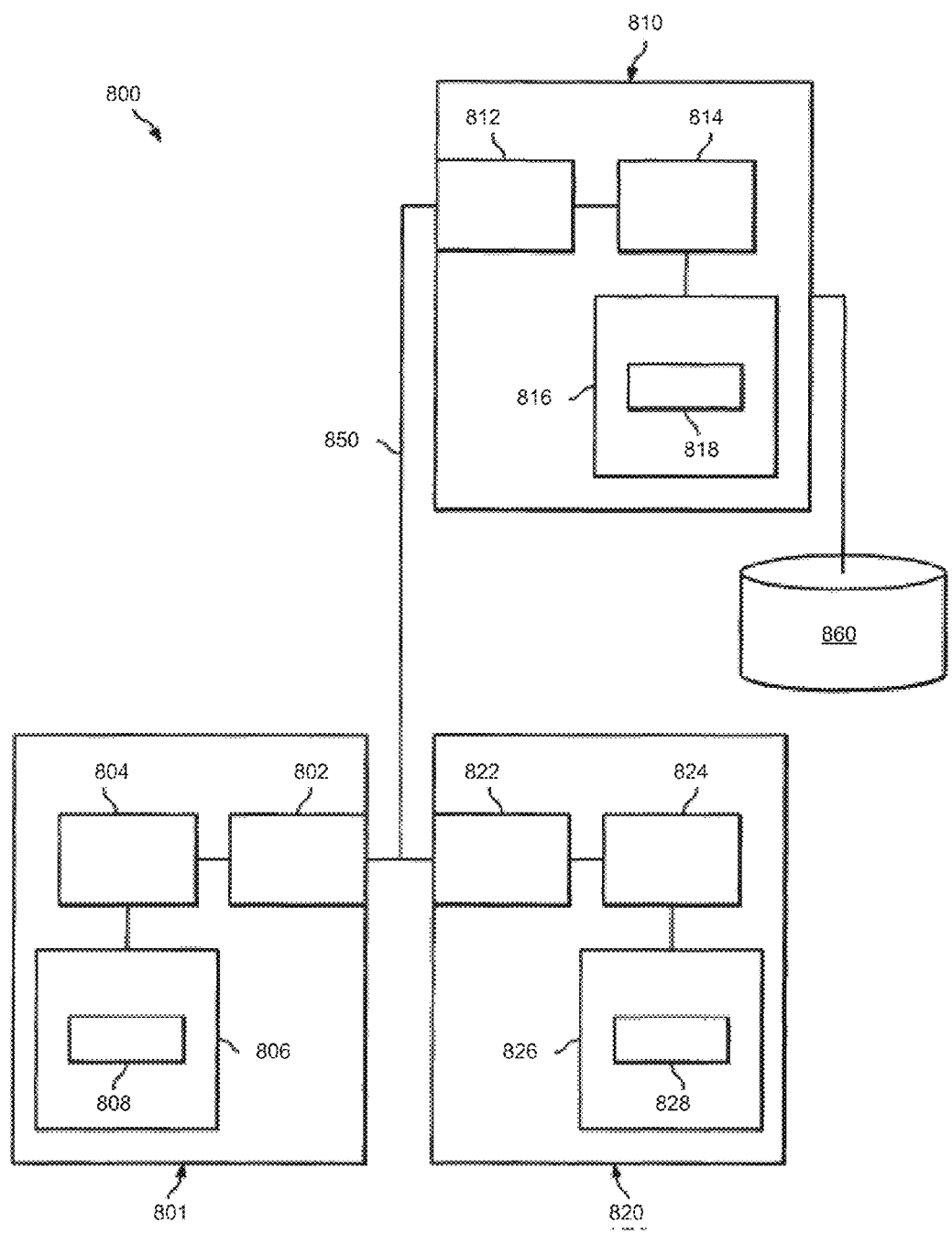
FIG. 8 shows a diagrammatic representation of an example system for encrypting a virtual machine image and for providing secure and remote access to secret information.

FIG. 8 is a diagrammatic representation of one embodiment of a system 800 providing secure and remote access to secret information. System 800 can include one or more client devices 801, one or more servers 810 and one or more trustee devices 820. Client device 801, server 810 and trustee devices 820 can be connected by a standard transmission channel 850, which may be a wired or wireless network, including a local area network (LAN), wide area network (WAN), the Internet, or other wired and/or wireless network.

According to one embodiment, client device 801 can be a computer including a central processing unit ("CPU") (e.g., CPU 804), a network connection device 802, and a non-transitory computer readable medium 806. Computer readable medium 806 can comprise any combination of a primary memory, a secondary memory, a random access memory (RAM), a read only memory (ROM), and/or a magnetic storage device such as a hard drive (HD) or other non-transitory computer readable storage medium. Each computer readable medium may store a number of computer programs. For example, computer readable medium 806 may store client application 808. By way of example, but no limitation, the client application may be compiled Windows/Linux/MacOS program, Android/iOS/Blackberry/WebOS mobile application, or other application that registers, puts, and gets information from the server application over a network protocol, such as http, https or other network protocol. According to one embodiment, client application 808 may be an application running in a browser environment. Client application 808 can be used to communicate with server 810 to request secret information on behalf of itself or another program.

Server 810 can include a plurality of server computer components, including a CPU 814, a network connection device 812, and a non-transitory computer readable medium 816. Computer readable medium 816 can comprise any combination of a primary memory, a secondary memory, a RAM, a ROM, and/or a magnetic storage device such as a HD or other non-transitory computer readable storage medium. Computer readable medium 816 may store a number of computer programs. As shown in FIG. 8, server 810 may store a trustee server application 818. By way of example, but not limitation, server application 818 may be a compiled program and web service that sends and receives messages to both client applications and trustee applications over a network protocol such as http, https, smtp, or others. The server application may be distributed over multiple servers including web servers and/or application servers. Server 810 may be coupled to a repository 860 that stores secret data, along with access control information, trustee lists and configurable policies.

Trustee devices 820 can include a plurality of computer components, including a CPU 824, a network connection device 828, and a non-transitory computer readable medium 826. Computer readable medium 726 can comprise any combination of a primary memory, a secondary memory, a RAM, a ROM, and/or a magnetic storage device such as a HD or other non-transitory computer readable storage medium. Computer readable medium 826 may store a number of computer programs. As shown in FIG. 8, a trustee device 820 may store a trustee application 828. By way of example, but not limitation, trustee application 828 may take several different forms, including, but not limited to simple Email and Web applications, Android/iOS/Blackberry/WebOS mobile applications, as well as native compiled clients for Windows/Mac/Linux or applications running in a browser environment.

Disclaimers

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It is also within the spirit and scope of the invention to implement through software programming, operations, methods, routines or portions thereof described herein, where such software programming or code is stored in a computer-readable medium and can be operated on by a processor to permit a computer to perform any of the steps, operations, methods, routines or portions thereof described herein. Embodiments may be implemented in one or more digital computers executing programming instructions, by using application specific integrated circuits, programmable logic devices, field programmable gate arrays, optical, chemical, biological, quantum or nano engineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Although systems and methods have been described with respect to specific embodiments thereof, these embodiments are merely illustrative, and not restrictive. The description herein of illustrated embodiments of the invention, including the description in the Figures, is not intended to be exhaustive or to limit the systems and methods to the precise forms disclosed herein and the inclusion of any particular embodiment, feature or function within the description, including the Figures, is not intended to limit the scope of the systems and methods to such embodiment, feature or function). Rather, the description is intended to describe illustrative embodiments, features and functions in order to provide a person of ordinary skill in the art context to understand the disclosure without limiting the systems and methods to any particularly described embodiment, feature or function, including any such embodiment feature or function described in the Exhibits. While specific embodiments of, and examples for, are described herein for illustrative purposes only, various equivalent modifications are possible within the spirit and scope of the invention, as those skilled in the relevant art will recognize and appreciate. As indicated, these modifications may be made in light of the foregoing description of illustrated embodiments and are to be included within the spirit and scope of the invention. Thus, while the systems and methods have been described herein with reference to particular embodiments thereof, a latitude of modification, various changes and substitutions are intended in the foregoing disclosures, and it will be appreciated that in some instances some features of embodiments will be employed without a corresponding use of other features without departing from the scope and spirit of the invention as set forth. Therefore, many modifications may be made.

What is claimed is:

1. A computer implemented method for encrypting a virtual machine image, the method comprising:
    locating an encrypted virtual machine image including an encryption boot loader;
    extracting the encryption boot loader from the encrypted virtual machine image;
    transmitting the extracted encryption boot loader to a designated trustee;
    placing a pre-boot execution environment (PXE) on the encrypted virtual machine image; and
    booting an operation system associated with the encrypted virtual machine image, wherein booting the operating system associated with encrypted virtual machine image includes:
        receiving, from the PXE of the encrypted virtual machine image, a signal to initiate retrieval of the encryption boot loader from the designated trustee;
        responsive to the signal from the PXE, retrieving the encryption boot loader from the designated trustee;
        updating the encrypted virtual machine image to include the encryption boot loader; and
        booting the operating system at the encrypted virtual machine using the encryption boot loader.

2. The method of claim 1, further comprising:
    transmitting a decryption key associated with the encrypted virtual machine image to the designated trustee.

3. The method of claim 1, further comprising:
    encrypting the virtual machine image; and
    inserting the encryption boot loader into the encrypted virtual machine image.

4. The method of claim 1, further comprising transmitting the encrypted virtual machine image to a public cloud computing platform.

5. The method of claim 1, wherein the encrypted virtual machine image represents a virtual machine environment with one or more encrypted storage partitions.

6. The method of claim 1, wherein booting the operating system associated with the encrypted virtual machine image, further comprises:
    verifying the identity of the encrypted virtual machine image from which the signal was received;
    responsive to verification of the encrypted virtual machine image, retrieving a decryption key associated with the encrypted virtual machine image from the designated trustee;
    processing the retrieved encryption boot loader by injecting the retrieved decryption key in to the encryption boot loader; and
    performing a pre-boot authentication of the encrypted virtual machine image using the processed encryption boot loader.

7. The method of claim 1, wherein retrieving the encryption boot loader from the designated trustee includes:
    sending a request to a server coupled to a data repository storing the encryption boot loader;
    wherein the storage of encryption boot loader is associated with a plurality of trustees; and
    retrieving the encryption boot loader only if, the request is authorized;
    wherein the request is authorized based on the application at the server of a trustee policy to responses by the one or more designated trustees to the request.

8. A system comprising: a processor; and
a memory having instructions stored thereon, which when executed by the processor, cause the system to:
    locate an encrypted virtual machine image including an encryption boot loader;
    extract the encryption boot loader from an encrypted virtual machine image;
    transmit the extracted encryption boot loader to a designated trustee;
    place a pre-boot execution environment (PXE) on the encrypted virtual machine image; and
    boot an operation system associated with the encrypted virtual machine image, wherein the instructions in the memory to boot the operating system include further instructions, which when executed by the processor, cause the system to:
        receive, from the PXE of the encrypted virtual machine image, a signal to initiate retrieval of the encryption boot loader from the designated trustee;
        retrieve the encryption boot loader from the designated trustee in response to the received signal from the PXE;
        update the encrypted virtual machine image to include the encryption boot loader; and
        boot the operating system at the encrypted virtual machine using the encryption boot loader.

9. The system of claim 8, wherein the memory has further instructions, which when executed by the processor, cause the system to:
    transmit a decryption key associated with the encrypted virtual machine image to the designated trustee.

10. The system of claim 8, wherein the memory has further instructions, which when executed by the processor, cause the system to:
    encrypt the virtual machine image; and
    insert the encryption boot loader into the encrypted virtual machine image.

11. The system of claim 8, wherein the memory has further instructions, which when executed by the processor, cause the system to:
    transmit, via a network, the encrypted virtual machine image to a public cloud computing platform.

12. The system of claim 8, wherein the encrypted virtual machine image represents a virtual machine environment with one or more encrypted storage partitions.

13. The system of claim 8, wherein the instructions in the memory to boot the operating system include further instructions, which when executed by the processor, cause the system to:
    verify the identity of the encrypted virtual machine image from which the signal was received;
    retrieve a decryption key associated with the encrypted virtual machine image from the designated trustee, in response to verification of the encrypted virtual machine image;
    process the retrieved encryption boot loader by injecting the retrieved decryption key in to the encryption boot loader; and perform a pre-boot authentication of the encrypted virtual machine image using the processed encryption boot loader.

14. The system of claim 8, wherein the instructions in the memory to retrieve the encryption boot loader from the designated trustee, include further instructions, which when executed by the processor, cause the system to:
send a request to a server coupled to a data repository storing the encryption boot loader;
wherein the storage of encryption boot loader is associated with a plurality of trustees; and
retrieve the encryption boot loader only if, the request is authorized;
wherein the request is authorized based on the application at the server of a trustee policy to responses to the request by the one or more designated trustees.

* * * * *

UNITED STATES PATENT AND TRADEMARK OFFICE
CERTIFICATE OF CORRECTION

PATENT NO. : 9,934,382 B2
APPLICATION NO. : 14/526372
DATED : April 3, 2018
INVENTOR(S) : Eduardo Garcia Page 1 of 1

It is certified that error appears in the above-identified patent and that said Letters Patent is hereby corrected as shown below:

In the Specification

In Column 3, Line 12, delete "embodiment." and insert -- embodiment, --, therefor.

In Column 3, Line 36, delete "Kernal" and insert -- Kernel --, therefor.

In Column 6, Line 36, delete "such/as" and insert -- such as --, therefor.

In Column 9, Line 53, delete "the of seed 228" and insert -- the seed 228 --, therefor.

In Column 13, Line 6, delete "information." and insert -- information, --, therefor.

In Column 14, Line 58, delete "that that" and insert -- that --, therefor.

Signed and Sealed this
Twenty-ninth Day of May, 2018

Andrei Iancu
*Director of the United States Patent and Trademark Office*